United States Patent
Kitamura et al.

(10) Patent No.: US 9,289,651 B2
(45) Date of Patent: Mar. 22, 2016

(54) GOLF BALL RESIN COMPOSITION AND GOLF BALL

(71) Applicant: DUNLOP SPORTS CO. LTD., Kobe-shi, Hyogo (JP)

(72) Inventors: Akinori Kitamura, Kobe (JP); Kazuyoshi Shiga, Kobe (JP); Takahiro Shigemitsu, Kobe (JP); Yu Kawabata, Kobe (JP)

(73) Assignee: DUNLOP SPORTS CO. LTD., Kobe-Shi (JP)

( * ) Notice: Subject to any disclaimer, the term of this patent is extended or adjusted under 35 U.S.C. 154(b) by 102 days.

(21) Appl. No.: 13/952,992

(22) Filed: Jul. 29, 2013

(65) Prior Publication Data
US 2014/0031145 A1 Jan. 30, 2014

(30) Foreign Application Priority Data

Jul. 30, 2012 (JP) .................................. 2012-168794
Jan. 17, 2013 (JP) .................................. 2013-006496

(51) Int. Cl.

| | | |
|---|---|---|
| C08K 5/19 | (2006.01) | |
| C08K 5/42 | (2006.01) | |
| A63B 37/00 | (2006.01) | |
| C08K 5/103 | (2006.01) | |
| C08K 5/1535 | (2006.01) | |
| C08K 5/17 | (2006.01) | |
| C08K 5/00 | (2006.01) | |
| C08K 5/20 | (2006.01) | |
| C08K 5/3445 | (2006.01) | |

(52) U.S. Cl.
CPC ......... *A63B 37/0039* (2013.01); *A63B 37/0051* (2013.01); *A63B 37/0059* (2013.01); *A63B 37/0073* (2013.01); *C08K 5/0008* (2013.01); *C08K 5/0016* (2013.01); *C08K 5/103* (2013.01); *C08K 5/1535* (2013.01); *C08K 5/17* (2013.01); *C08K 5/175* (2013.01); *C08K 5/19* (2013.01); *C08K 5/20* (2013.01); *C08K 5/3445* (2013.01); *C08K 5/42* (2013.01)

(58) Field of Classification Search
None
See application file for complete search history.

(56) References Cited

U.S. PATENT DOCUMENTS

| | | | | |
|---|---|---|---|---|
| 5,474,776 | A | * 12/1995 | Koyanagi ................. | A61K 8/39 424/401 |
| 2002/0013421 | A1 | 1/2002 | Takesue et al. | |
| 2003/0224873 | A1 | 12/2003 | Ichikawa et al. | |
| 2004/0106736 | A1 | 6/2004 | Takesue et al. | |
| 2006/0014898 | A1 | 1/2006 | Kim | |
| 2007/0049673 | A1 | 3/2007 | Sullivan | |
| 2009/0203469 | A1* | 8/2009 | Sullivan ........................ | 473/374 |
| 2010/0048327 | A1* | 2/2010 | Bulpett et al. ................. | 473/374 |
| 2010/0240468 | A1* | 9/2010 | Rajagopalan et al. ......... | 473/372 |

FOREIGN PATENT DOCUMENTS

| | | |
|---|---|---|
| JP | 2001-348467 A | 12/2001 |
| JP | 2003-339911 A | 12/2003 |
| JP | 2004-180725 A | 7/2004 |
| JP | 2006-28517 A | 2/2006 |
| JP | 2007-90048 A | 4/2007 |

* cited by examiner

*Primary Examiner* — David Buttner
(74) *Attorney, Agent, or Firm* — Birch, Stewart, Kolasch & Birch, LLP

(57) ABSTRACT

The invention provides a resin composition for golf balls having excellent resilience, flexibility and fluidity, and golf balls having excellent resilience and shot feel. The resin composition comprises: (A) at least one selected from the group consisting of (a-1) a binary copolymer of an olefin and a $C_{3-8}$ α,β-unsaturated carboxylic acid, (a-2) a metal ion-neutralized product of a binary copolymer of an olefin and a $C_{3-8}$ α,β-unsaturated carboxylic acid, (a-3) a ternary copolymer of an olefin, a $C_{3-8}$ α,β-unsaturated carboxylic acid, and an α,β-unsaturated carboxylic acid ester, and (a-4) a metal ion-neutralized product of a ternary copolymer of an olefin, a $C_{3-8}$ α,β-unsaturated carboxylic acid, and an α,β-unsaturated carboxylic acid ester; (B) a compound containing a hydrocarbon chain, a cationic moiety, and an anionic moiety in its molecule; and (C) a nonionic surfactant, wherein a total degree of neutralization expressed by the following equation is 50-300 mol %:

$$\text{Total degree of neutralization (\%)} = \frac{\sum(\text{number of moles of cation component in resin composition} \times \text{valence of cation component})}{\sum(\text{number of moles of anion component in resin composition} \times \text{valence of anion component})} \times 100.$$

16 Claims, No Drawings

GOLF BALL RESIN COMPOSITION AND GOLF BALL

TECHNICAL FIELD

The present invention relates to a resin composition for golf balls and golf balls using the resin composition.

BACKGROUND ART

Golf balls having various structures have been devised, and include one-piece golf balls consisting of a golf ball body, two-piece golf balls including a core and a cover, three-piece golf balls including a core composed of a center and a single intermediate layer covering the center, and a cover covering the core, and multi-piece golf balls including a core composed of a center and at least two intermediate layers covering the center, and a cover covering the core.

Ionomer resins are widely used as materials for golf balls because these ionomer resins enable golf balls to be very rigid and achieve a long flight distance. In particular, highly resilient materials are demanded. Ionomer resins having an increased degree of neutralization are known to increase resilience. Unfortunately, such highly neutralized ionomer resins have low fluidity and thus are difficult to mold. Further, as the degree of neutralization is increased, resilience is improved, but hardness tends to undesirably increase at the same time, which results in lower flexibility and poorer shot feel.

To solve this problem, a method for reducing hardness while increasing resilience by adding a large amount of a fatty acid (metal soap) to a highly neutralized ionomer resin has been proposed. Unfortunately, the acid component in the fatty acid consumes metal ions used for neutralization, and prevents the highly neutralized ionomer resin from providing the effect of increasing resilience sufficiently. Thus, the method has an insufficient effect in increasing flexibility and resilience in order to provide a golf ball that simultaneously achieves good shot feel and resilience. Moreover, the method needs a large amount of the metal component.

Further, Patent Literature 1 discloses a golf ball material prepared using an ionomer resin and a compound containing both acid and amine functional groups in the same molecule. Patent Literature 2 discloses a golf ball formed using an acid polymer containing 70% or more-neutralized acid groups and a polyhydric alcohol. Patent Literatures 3 and 4 disclose resin compositions for golf balls including an ionomer resin and a compound containing two or more reactive functional groups and having a molecular weight of 20,000 or less. Moreover, Patent Literature 5 discloses a resin composition for golf balls including a thermoplastic resin such as a terionomer, and teaches that a fatty acid derivative such as an alcohol fatty acid ester, glycerol fatty acid ester, or glycol fatty acid ester may be added in the resin composition.

Unfortunately, the golf ball materials disclosed in these literatures still leave something to be desired in terms of increasing flexibility and resilience at the same time. They are also demanded to simultaneously have good fluidity.

CITATION LIST

Patent Literature

Patent Literature 1: JP 2006-28517A
Patent Literature 2: JP 2007-90048A
Patent Literature 3: JP 2003-339911A
Patent Literature 4: JP 2004-180725A
Patent Literature 5: JP 2001-348467A

SUMMARY OF INVENTION

Technical Problem

In order to solve the problems above, an object of the present invention is to provide a resin composition for golf balls that has excellent resilience, flexibility and fluidity. Another object of the present invention is to provide golf balls having excellent resilience and shot feel.

Solution to Problem

The present invention relates to a resin composition for golf balls, comprising: (A) a resin component containing at least one selected from the group consisting of (a-1) a binary copolymer of an olefin and a $C_{3-8}$ α,β-unsaturated carboxylic acid, (a-2) a metal ion-neutralized product of a binary copolymer of an olefin and a $C_{3-8}$ α,β-unsaturated carboxylic acid, (a-3) a ternary copolymer of an olefin, a $C_{3-8}$ α,β-unsaturated carboxylic acid, and an α,β-unsaturated carboxylic acid ester, and (a-4) a metal ion-neutralized product of a ternary copolymer of an olefin, a $C_{3-8}$ α,β-unsaturated carboxylic acid, and an α,β-unsaturated carboxylic acid ester; (B) a compound containing a hydrocarbon chain, a cationic moiety, and an anionic moiety in its molecule; and (C) a nonionic surfactant, wherein a total degree of neutralization expressed by the following equation is 50 to 300 mol %:

$$\text{Total degree of neutralization (\%)} = \frac{\sum(\text{number of moles of cation component in resin composition} \times \text{valence of cation component})}{\sum(\text{number of moles of anion component in resin composition} \times \text{valence of anion component})} \times 100$$

The compound (B) containing a hydrocarbon chain, a cationic moiety, and an anionic moiety in its molecule is preferably an amphoteric surfactant. Here, the amphoteric surfactant is preferably at least one selected from the group consisting of betaine amphoteric surfactants, amide amino acid amphoteric surfactants, alkylamino fatty acid salts, alkyl amine oxides, β-alanine amphoteric surfactants, glycine amphoteric surfactants, sulfobetaine amphoteric surfactants, and phosphobetaine amphoteric surfactants.

The nonionic surfactant (C) is preferably a polyhydric alcohol nonionic surfactant.

The nonionic surfactant (C) is preferably at least one selected from the group consisting of fatty acid esters obtained by reaction of polyhydric alcohols with fatty acids, AO adducts of the fatty acid esters obtained by addition of alkylene oxides to the fatty acid esters, fatty acid alkanolamides obtained by reaction of fatty acids with alkanolamines, and alkyl ethers of polyhydric alcohols.

The nonionic surfactant (C) is preferably a fatty acid ester obtained by reacting a polyhydric alcohol with a $C_{8-30}$ fatty acid. Here, the fatty acid ester is preferably a compound in which hydroxyl groups of the polyhydric alcohol are partially esterified.

The polyhydric alcohol is preferably at least one selected from the group consisting of glycerol, polyglycerol, saccharides, and sugar alcohols.

The nonionic surfactant (C) is preferably at least one selected from the group consisting of glycerol monocaprylate, glycerol monocaprate, glycerol monooleate, glycerol dioleate, diglycerol monolaurate, sorbitan monooleate, sorbitan dioleate, sorbitan trioleate, and sorbitan tetraoleate.

Preferably, the compound (B) containing a hydrocarbon chain, a cationic moiety, and an anionic moiety in its molecule is an alkyl betaine amphoteric surfactant, and the nonionic surfactant (C) is a polyhydric alcohol nonionic surfactant.

Preferably, 1 to 200 parts by mass of the compound (B) containing a hydrocarbon chain, a cationic moiety, and an anionic moiety in its molecule is contained per 100 parts by mass of the resin component (A).

Preferably, 10 to 200 parts by mass of the nonionic surfactant (C) is contained per 100 parts by mass of the resin component (A).

The resin composition preferably further comprises (D) a basic inorganic metal compound in an amount of 100 parts by mass or less per 100 parts by mass of the resin component (A).

Preferably, a blending ratio [(B)/(C)] of the compound (B) containing a hydrocarbon chain, a cationic moiety, and an anionic moiety in its molecule to the nonionic surfactant (C) is 95/5 to 15/85 by mass ratio.

The resin composition preferably satisfies the following relationship:

5 parts by mass≤[(amount of (B))−(amount of (C))]
≤100 parts by mass.

The present invention relates to a golf ball, comprising a structural member formed from the resin composition for golf balls.

The present invention relates to a golf ball, comprising a core having one or more layers and a cover covering the core, wherein at least one of the layers of the core is formed from the resin composition for golf balls.

The present invention relates to a one-piece golf ball comprising a golf ball body formed from the resin composition for golf balls.

Advantageous Effects of Invention

The present invention provides a resin composition for golf balls which combines a specific resin with two components, that is, a compound containing a hydrocarbon chain, a cationic moiety, and an anionic moiety and a nonionic surfactant, and has a specific total degree of neutralization. The resin composition makes it possible to increase flexibility while suppressing the reduction of resilience and to reduce the melt viscosity to increase fluidity. Consequently, the present invention can provide a resin composition for golf balls that has excellent resilience, flexibility and fluidity, and use of the resin composition can provide golf balls having excellent resilience and shot feel.

DESCRIPTION OF EMBODIMENTS

The resin composition for golf balls of the present invention comprises: (A) at least one selected from the group consisting of (a-1) a binary copolymer of an olefin and a $C_{3-8}$ α,β-unsaturated carboxylic acid, (a-2) a metal ion-neutralized product of a binary copolymer of an olefin and a $C_{3-8}$ α,β-unsaturated carboxylic acid, (a-3) a ternary copolymer of an olefin, a $C_{3-8}$ α,β-unsaturated carboxylic acid, and an α,β-unsaturated carboxylic acid ester, and (a-4) a metal ion-neutralized product of a ternary copolymer of an olefin, a $C_{3-8}$ α,β-unsaturated carboxylic acid, and an α,β-unsaturated carboxylic acid ester; (B) a compound containing a hydrocarbon chain, a cationic moiety, and an anionic moiety in its molecule; and (C) a nonionic surfactant. Additionally, the resin composition for golf balls has a specific total degree of neutralization.

As described above, it is generally difficult to provide a golf ball material having both good resilience and good flexibility by using a resin component such as an ionomer resin. However, the addition of two components, that is, a compound containing a hydrocarbon chain, a cationic moiety, and an anionic moiety and a nonionic surfactant enables to increase flexibility without reducing resilience, and reduce the melt viscosity. As a result, a resin composition for golf balls having all of the following properties: resilience, flexibility and fluidity can be provided. Moreover, use of the resin composition can provide golf balls having excellent resilience and shot feel. The reason why such effects are achieved is presumed as follows.

When two components, that is, a compound containing a hydrocarbon chain, a cationic moiety, and an anionic moiety and a nonionic surfactant are added to an ionomer resin, the compound and the surfactant are thought to be involved into ionic aggregates of the ionomer resin and then serve to: (I) finely disperse the ionic aggregates and thereby inhibit crystallization of the ethylene chains; and to (II) loosen the restriction of main chains which is due to the ionic aggregates. Presumably, such effects lead to increased mobility of the molecular chains of the ionomer resin, and therefore both flexibility and resilience are simultaneously improved.

Moreover, in the case of using the above compound, unlike the case of adding a fatty acid, the metal component is not consumed since the compound contains both cationic and anionic moieties. Thus, the effect of increasing resilience due to a high degree of neutralization can be sufficiently achieved without using a large amount of the metal component. Additionally, the compound has high affinity for the ionic aggregates. Therefore, the functions (I) and (II) are effectively exhibited. Also in the case of using the nonionic surfactant, unlike the case of adding a fatty acid, the metal component is not consumed. Thus, the effect of increasing resilience due to a high degree of neutralization can be sufficiently achieved without using a large amount of the metal component. Consequently, when these two components are used in combination, both flexibility and resilience are achieved effectively and synergistically.

In addition, the use of the nonionic surfactant reduces the melt viscosity of the resin composition and thereby improves the fluidity of the resin composition. This is presumably because the crosslinking strength of the ionic aggregates is weakened since the electrostatic attraction between the surfactant and metal ions is weak.

First, the components (a-1) to (a-4) used as the resin component (A) in the present invention will be described.

The component (a-1) is a binary copolymer of an olefin and a $C_{3-8}$ α,β-unsaturated carboxylic acid, and it is a nonionic copolymer whose carboxyl groups are not neutralized. The component (a-2) is a metal ion-neutralized product of a binary copolymer of an olefin and a $C_{3-8}$ α,β-unsaturated carboxylic acid, and examples thereof include ionomer resins obtained by neutralizing at least part of the carboxyl groups of the copolymer by metal ions.

The component (a-3) is a ternary copolymer of an olefin, a $C_{3-8}$ α,β-unsaturated carboxylic acid, and an α,β-unsaturated carboxylic acid ester, and it is a nonionic copolymer whose carboxyl groups are not neutralized. The component (a-4) is a metal ion-neutralized product of a ternary copolymer of an olefin, a $C_{3-8}$ α,β-unsaturated carboxylic acid, and an α,β-unsaturated carboxylic acid ester, and examples thereof include ionomer resins obtained by neutralizing at least part of the carboxyl groups of the copolymer by metal ions.

In the present invention, the "binary copolymer (a-1) of an olefin and a $C_{3-8}$ α,β-unsaturated carboxylic acid" may also be referred to simply as the "binary copolymer"; the "ionomer resin consisting of (a-2) a metal ion-neutralized product of a binary copolymer of an olefin and a $C_{3-8}$ α,β-unsaturated carboxylic acid" as the "binary ionomer resin"; the "ternary copolymer (a-3) of an olefin, a $C_{3-8}$ α,β-unsaturated carboxylic acid, and an α,β-unsaturated carboxylic acid ester" simply as the "ternary copolymer"; and the "ionomer resin consisting of (a-4) a metal ion-neutralized product of a ternary copolymer of an olefin, a $C_{3-8}$ α,β-unsaturated carboxylic acid, and an α,β-unsaturated carboxylic acid ester" as the "ternary ionomer resin".

The olefin in the components (a-1) to (a-4) is preferably an olefin having 2 to 8 carbon atoms. Examples thereof include ethylene, propylene, butene, pentene, hexene, heptene, and octene. Particularly, ethylene is preferred. Examples of the $C_{3-8}$ α,β-unsaturated carboxylic acid include acrylic acid, methacrylic acid, fumaric acid, maleic acid, and crotonic acid. Particularly, acrylic acid or methacrylic acid is preferred. Examples of the α,β-unsaturated carboxylic acid ester include methyl, ethyl, propyl, n-butyl, or isobutyl esters of acrylic acid, methacrylic acid, fumaric acid, maleic acid and the like. Particularly, acrylic or methacrylic acid esters are preferred.

The binary copolymer (a-1) is preferably a binary copolymer of ethylene and (meth)acrylic acid. The binary ionomer resin (a-2) is preferably a metal ion-neutralized product of a binary copolymer of ethylene and (meth)acrylic acid. The ternary copolymer (a-3) is preferably a ternary copolymer of ethylene, (meth)acrylic acid, and a (meth)acrylic acid ester. The ternary ionomer resin (a-4) is preferably a metal ion-neutralized product of a ternary copolymer of ethylene, (meth)acrylic acid, and a (meth)acrylic acid ester. Here, (meth)acrylic acid means acrylic acid and/or methacrylic acid.

The content of the $C_{3-8}$ α,β-unsaturated carboxylic acid component in the binary copolymer (a-1) or ternary copolymer (a-3) is preferably 4% by mass or more, and more preferably 5% by mass or more. The content is preferably 30% by mass or less, and more preferably 25% by mass or less.

The binary copolymer (a-1) or ternary copolymer (a-3) preferably has a melt flow rate (190° C., a load of 2.16 kg) of 5 g/10 min or more, more preferably 10 g/10 min or more, and still more preferably 15 g/10 min or more. The melt flow rate is preferably 1700 g/10 min or less, more preferably 1500 g/10 min or less, and still more preferably 1300 g/10 min or less. With a melt flow rate of the binary copolymer (a-1) or ternary copolymer (a-3) of 5 g/10 min or more, the resin composition for golf balls has good fluidity, facilitating molding of a structural member. With a melt flow rate of 1700 g/10 min or less, a golf ball to be obtained has better durability.

Specific examples (indicated by trade name) of the binary copolymer (a-1) include ethylene-methacrylic acid copolymers available from DU PONT-MITSUI POLYCHEMICALS CO., LTD. under the trade name "NUCREL (registered trademark) (e.g. "NUCREL N1050H," "NUCREL N2050H," "NUCREL N1110H," and "NUCREL N0200H")", and "NUCREL N1560"; and ethylene-acrylic acid copolymers available from The Dow Chemical Company under the trade name "PRIMACOR (registered trademark) 5980I."

Specific examples (indicated by trade name) of the ternary copolymer (a-3) include the trade name "NUCREL (registered trademark) (e.g. "NUCREL AN4318" and "NUCREL AN4319")" available from DU PONT-MITSUI POLYCHEMICALS CO., LTD.; the trade name "NUCREL (registered trademark) (e.g. "NUCREL AE")" available from Du Pont; and the trade name "PRIMACOR (registered trademark) (e.g. "PRIMACOR AT310" and "PRIMACOR AT320")" available from The Dow Chemical Company. These binary copolymers (a-1) or ternary copolymers (a-3) may be used singly or in combinations of two or more.

The content of the $C_{3-8}$ α,β-unsaturated carboxylic acid component in the binary ionomer resin (a-2) is preferably 8% by mass or more, more preferably 10% by mass or more, and still more preferably 12% by mass or more. The content is preferably 30% by mass or less, and more preferably 25% by mass or less. With a content of 8% by mass or more, a structural member to be obtained is easily designed to have desired resilience performance. With a content of 30% by mass or less, the melt viscosity of a structural member to be obtained is prevented from being excessively increased, leading to good molding properties.

The degree of neutralization of the carboxyl groups of the binary ionomer resin (a-2) is preferably 15 mol % or more, and more preferably 20 mol % or more. The degree of neutralization is preferably 90 mol % or less, and more preferably 85 mol % or less. With a degree of neutralization of 15 mol % or more, a golf ball to be obtained has good resilience and durability. With a degree of neutralization of 90 mol % or less, the resin composition for golf balls has good fluidity.

The degree of neutralization of the carboxyl groups of the binary ionomer resin (a-2) can be determined by the following equation:

(degree of neutralization of binary ionomer resin)
=100×(number of moles of neutralized carboxyl groups in binary ionomer resin)/(total number of moles of carboxyl groups of binary ionomer resin).

Examples of metal ions usable for neutralizing at least part of the carboxyl groups of the binary ionomer resin (a-2) include monovalent metal ions such as sodium, potassium, and lithium; divalent metal ions such as magnesium, calcium, zinc, barium, and cadmium; trivalent metal ions such as aluminum; and other ions such as tin and zirconium.

Specific examples (indicated by trade name) of the binary ionomer resin (a-2) include "Himilan (registered trademark) (e.g. Himilan 1555 (Na), Himilan 1557 (Zn), Himilan 1605 (Na), Himilan 1706 (Zn), Himilan 1707 (Na), Himilan AM7311 (Mg), and Himilan AM7329 (Zn))" available from DU PONT-MITSUI POLYCHEMICALS CO., LTD. Examples thereof further include "Surlyn (registered trademark) (e.g. Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), and Surlyn AD8546 (Li))" available from Du Pont. Other examples include ionomer resins available from ExxonMobil Chemical such as "Iotek (registered trademark) (e.g. Iotek 8000 (Na), Iotek 8030 (Na), Iotek 7010 (Zn), and Iotek 7030 (Zn))." Here, Na, Zn, Li, Mg, and the like in the round brackets following the trade names indicate metal species of the metal ions for neutralization. The mentioned binary ionomer resins (a-2) may be used singly or as a blend of two or more.

The binary ionomer resin (a-2) preferably has a bending rigidity of 50 MPa or more, more preferably 70 MPa or more, and still more preferably 80 MPa or more. The bending rigidity is preferably 500 MPa or less, more preferably 400 MPa or less, and still more preferably 350 MPa or less. With an excessively low bending rigidity, the resilience of the golf ball tends to be reduced, leading to reduced flight distance. With an excessively high bending rigidity, the durability of the golf ball may be reduced.

The binary ionomer resin (a-2) preferably has a melt flow rate (190° C., a load of 2.16 kg) of 0.1 g/10 min or more, more preferably 0.5 g/10 min or more, and still more preferably 1.0 g/10 min or more. The melt flow rate is preferably 80 g/10 min or less, more preferably 70 g/10 min or less, and still more preferably 65 g/10 min or less. With a melt flow rate of the binary ionomer resin (a-2) of 0.1 g/10 min or more, the resin composition for golf balls has good fluidity, enabling molding of a thin layer, for example. With a melt flow rate of 80 g/10 min or less, a golf ball to be obtained has better durability.

The binary ionomer resin (a-2) preferably has a slab hardness of 10 or more, more preferably 15 or more, and still more preferably 20 or more in terms of Shore D hardness. The slab hardness (Shore D hardness) is preferably 75 or less, more preferably 73 or less, and still more preferably 70 or less. With a slab hardness of the binary ionomer resin (a-2) of 10 or more, a structural member to be obtained has good resilience. With a slab hardness of 75 or less, a structural member to be obtained is prevented from being excessively hard, and the golf ball has better durability.

The content of the $C_{3-8}$ α,β-unsaturated carboxylic acid component in the ternary ionomer resin (a-4) is preferably 2% by mass or more, and more preferably 3% by mass or more. The content is preferably 30% by mass or less, and more preferably 25% by mass or less.

The degree of neutralization of the carboxyl groups of the ternary ionomer resin (a-4) is preferably 20 mol % or more, and more preferably 30 mol % or more. The degree of neutralization is preferably 90 mol % or less, and more preferably 85 mol % or less. With a degree of neutralization of 20 mol % or more, the golf ball to be formed from the resin composition for golf balls has good resilience and durability. With a degree of neutralization of 90 mol % or less, the resin composition for golf balls has good fluidity.

The degree of neutralization of the carboxyl groups of the ternary ionomer resin (a-4) can be determined by the following equation:

(degree of neutralization of ternary ionomer resin)
=100×(number of moles of neutralized carboxyl groups in ternary ionomer resin)/(total number of moles of carboxyl groups of ternary ionomer resin).

Examples of metal ions usable for neutralizing at least part of the carboxyl groups of the ternary ionomer resin (a-4) include those mentioned for the binary ionomer resin (a-2). The ternary ionomer resin (a-4) is preferably neutralized by magnesium ions. Neutralization by magnesium ions increases rebound resilience.

Specific examples (indicated by trade name) of the ternary ionomer resin (a-4) include "Himilan (registered trademark) (e.g. Himilan AM7327 (Zn), Himilan 1855 (Zn), Himilan 1856 (Na), and Himilan AM7331 (Na))" available from DU PONT-MITSUI POLYCHEMICALS CO., LTD. Other examples include ternary ionomer resins available from Du Pont such as "Surlyn 6320 (Mg), Surlyn 8120 (Na), Surlyn 8320 (Na), Surlyn 9320 (Zn), and Surlyn 9320W (Zn)." Further examples include ternary ionomer resins available from ExxonMobil Chemical such as "Iotek 7510 (Zn) and Iotek 7520 (Zn)." Here, Na, Zn, Mg, and the like in the round brackets following the trade names indicate metal species of the metal ions for neutralization. These ternary ionomer resins (a-4) may be used singly or in combinations of two or more.

The ternary ionomer resin (a-4) preferably has a bending rigidity of 10 MPa or more, more preferably 11 MPa or more, and still more preferably 12 MPa or more. The bending rigidity is preferably 100 MPa or less, more preferably 97 MPa or less, and still more preferably 95 MPa or less. With an excessively low bending rigidity, the resilience of the golf ball tends to be reduced, leading to reduced flight distance. With an excessively high bending rigidity, the durability of the golf ball may be reduced.

The ternary ionomer resin (a-4) preferably has a melt flow rate (190° C., a load of 2.16 kg) of 0.1 g/10 min or more, more preferably 0.3 g/10 min or more, and swill more preferably 0.5 g/10 min or more. The melt flow rate is preferably 70 g/10 min or less, more preferably 60 g/10 min or less, and still more preferably 55 g/10 min or less. With a melt flow rate of the ternary ionomer resin (a-4) of 0.1 g/10 min or more, the resin composition for golf balls has good fluidity, facilitating molding of a thin layer. With a melt flow rate of 70 g/10 min or less, a golf ball to be obtained has better durability.

The ternary ionomer resin (a-4) preferably has a slab hardness of 1 or more, more preferably 3 or more, and still more preferably 5 or more in terms of Shore D hardness. The slab hardness (Shore D hardness) is preferably 70 or less, more preferably 65 or less, and still more preferably 60 or less. With a slab hardness of the ternary ionomer resin (a-4) of 1 or more, a structural member to be obtained is prevented from being excessively soft, and the golf ball has good resilience. With a slab hardness of 70 or less, a structural member to be obtained is prevented from being excessively hard, and the golf ball has better durability.

The resin composition for golf balls of the present invention preferably contains the ternary copolymer (a-3) or the ternary ionomer resin (a-4) as the resin component (A). This prevents a structural member to be obtained from being excessively hard, and increases resilience.

In preferred embodiments, the resin component of the resin composition for golf balls of the present invention consists only of at least one selected from the aforementioned components (a-1) to (a-4). Alternatively, the resin component may contain other thermoplastic elastomer(s) and/or thermoplastic resin(s) in a range that does not impair the effects of the present invention. When the resin component contains other thermoplastic elastomer(s) and/or thermoplastic resin(s), the total content of the components (a-1) to (a-4) is preferably 50% by mass or more, more preferably 60% by mass or more, and still more preferably 70% by mass or more of the resin component.

Next, the compound (B) containing a hydrocarbon chain, a cationic moiety, and an anionic moiety in its molecule used in the present invention will be described. Such a compound is not particularly limited as long as it contains any hydrocarbon chain optionally substituted by a group such as a hydroxyl group, a cationic moiety, and an anionic moiety. In particular, amphoteric surfactants can be suitably used.

The amphoteric surfactant refers to a surfactant containing a cationic moiety and an anionic moiety in its molecule. Examples of such surfactants include betaine amphoteric surfactants such as alkyl betaine amphoteric surfactants, amide betaine amphoteric surfactants, imidazolium betaine amphoteric surfactants, alkyl sulfobetaine amphoteric surfactants, and amide sulfobetaine amphoteric surfactants; amide amino acid amphoteric surfactants; alkylamino fatty acid salts; alkyl amine oxides; β-alanine amphoteric surfactants; glycine amphoteric surfactants; sulfobetaine amphoteric surfactants; and phosphobetaine amphoteric surfactants.

Examples of the alkyl betaine amphoteric surfactants include compounds represented by the following formula (1):

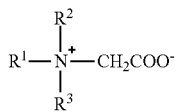

(1)

wherein R¹ represents an alkyl or alkenyl group having 8 to 30 carbon atoms; and R² and R³ are the same or different, and each represent an alkyl or hydroxyalkyl group having 1 to 20 carbon atoms.

Examples of the amide betaine amphoteric surfactants include compounds represented by the following formula (2):

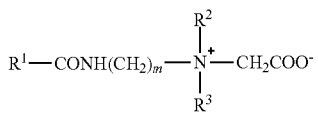

(2)

wherein R¹ represents an alkyl or alkenyl group having 8 to 30 carbon atoms; R² and R³ are the same or different, and each represent an alkyl or hydroxyalkyl group having 1 to 20 carbon atoms; and m represents an integer of 1 to 5.

Examples of the imidazolium betaine amphoteric surfactants include compounds represented by the following formula (3):

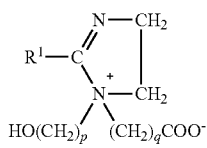

(3)

wherein R¹ represents an alkyl or alkenyl group having 8 to 30 carbon atoms; p and q are the same or different, and each represent an integer of 1 to 5.

Examples of the alkyl sulfobetaine amphoteric surfactants include compounds represented by the following formula (4):

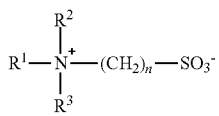

(4)

wherein R¹ represents an alkyl or alkenyl group having 8 to 30 carbon atoms; R² and R³ are the same or different, and each represent an alkyl or hydroxyalkyl group having 1 to 20 carbon atoms; and n represents an integer of 1 to 5.

Examples of the amide amino acid amphoteric surfactants include compounds represented by the following formula (5):

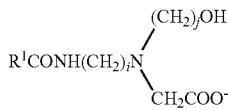

(5)

wherein R¹ represents an alkyl or alkenyl group having 8 to 30 carbon atoms; and i and j are the same or different, and each represent an integer of 1 to 5.

Examples of the alkyl amine oxides include compounds represented by the following formula (6):

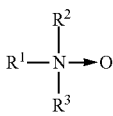

(6)

wherein R¹ represents an alkyl or alkenyl group having 8 to 30 carbon atoms; and R² and R³ are the same or different, and each represent an alkyl or hydroxyalkyl group having 1 to 20 carbon atoms.

In the formulas (1) to (6), R¹ to R³ each may be linear or branched. At least one of R¹ to R³ preferably has 12 to 18 carbon atoms. R² and R³ each preferably have 1 to 5 carbon atoms. Particularly preferably, R¹ has 12 to 18 carbon atoms, and R² and R³ each have 1 to 5 carbon atoms. the symbols m, p, q, n, i, and j each are preferably in the range of 1 to 3.

Examples of R¹ include alkyl groups such as an octyl group, a nonyl group, a decyl group, an undecyl group, a dodecyl group, a tridecyl group, a tetradecyl group, a pentadecyl group, a hexadecyl group, a heptadecyl group, an octadecyl group, an isooctadecyl group, a nonadecyl group, and an eicosyl group; alkenyl groups such as a tetradecenyl group, a hexadecenyl group, an octadecenyl group, an isooctadecenyl group, and an eicosenyl group; and mixtures thereof such as mixed alkyl groups including coconut oil alkyl groups, palm kernel oil alkyl groups, and beef tallow alkyl groups. Examples of R² and R³ include a methyl group, an ethyl group, a hydroxymethyl group, and a hydroxyethyl group.

Specific examples of the amphoteric surfactants include dimethyl lauryl betaine, dimethyl oleyl betaine, dimethyl stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, oleyl dihydroxymethyl betaine, cocamidopropyl betaine, lauramidoalkyl betaines, 2-alkyl-N-carboxyalkyl imidazolinium betaines, lauramidoalkyl hydroxylsulfobetaines, cocamidodialkyl hydroxyalkyl sulfobetaines, N-alkyl-β-aminopropionic acid salts, N-alkyl-β-iminodipropionic acid salts, alkyl diaminoalkyl glycines, alkyl polyaminoalkyl glycines, alkylamino fatty acid sodium salts, N,N-dimethyl octyl amine oxide, N,N-dimethyl lauryl amine oxide, and N,N-dimethyl stearyl amine oxide.

Among these amphoteric surfactants, betaine amphoteric surfactants are preferred, and alkyl betaine amphoteric surfactants represented by, for example, the formula (1) are more preferred, because they contribute to simultaneous achievement of resilience and flexibility.

The content of the compound (B) containing a hydrocarbon chain, a cationic moiety, and an anionic moiety in its molecule is preferably 1 part by mass or more, more preferably 3 parts by mass or more, and still more preferably 10 parts by mass or more, per 100 parts by mass of the resin component. The content is preferably 200 parts by mass or less, more preferably 150 parts by mass or less, and still more preferably 100 parts by mass or less. With a content in that range, resilience and flexibility can be improved in a balanced manner.

Next, the nonionic surfactant (C) used in the present invention will be described.

In the present invention, the nonionic surfactant refers to a surfactant containing a hydrophilic group that does not dissociate in water, such as a hydroxyl group (—OH) and an ether bond (—O—). Examples of such surfactants include polyhydric alcohol nonionic surfactants, polyethylene glycol nonionic surfactants, perfluoroalkyl polyoxyethylene ethers, and perfluoroalkenyl polyoxyethylene ethers. Among these, polyhydric alcohol nonionic surfactants and polyethylene glycol nonionic surfactants are preferred, and polyhydric alcohol nonionic surfactants are particularly preferred, because they contribute to better resilience, flexibility, and fluidity.

The polyhydric alcohol nonionic surfactant refers to a nonionic surfactant obtained by reacting a hydrophobic group-containing raw material such as a fatty acid with a polyhydric alcohol which is a hydrophilic group-containing raw material such as glycerol, polyglycerol, and sorbitan. Examples of such surfactants include: fatty acid esters obtained by reaction of dihydric or higher hydric alcohols with fatty acids having approximately 5 to 36 carbon atoms; AO adducts of the fatty acid esters obtained by addition of alkylene oxides (AO) such as ethylene oxide (EO) to the fatty acid esters; fatty acid alkanolamides obtained by reaction of fatty acids with alkanolamines; and alkyl ethers of polyhydric alcohols. Here, these fatty acid esters, AO adducts, fatty acid alkanolamides, and alkyl ethers may be those in which all the hydroxyl groups of the polyhydric alcohol or alkanolamine moiety are esterified or condensed, or may be those in which part of the hydroxyl groups are esterified or condensed (e.g. mono, di, tri, tetra). Preferred are those in which part of the hydroxyl groups are esterified or condensed. In the case of using AO adducts, the number of moles of AO added per molecule of the fatty acid ester is 0.5 to 50, preferably 0.5 to 30 on average.

The fatty acid forming the polyhydric alcohol nonionic surfactant such as a fatty acid ester preferably has 8 to 30 carbon atoms, more preferably 10 to 28 carbon atoms, and still more preferably 12 to 26 carbon atoms, because such nonionic surfactants contribute to better resilience, flexibility, and fluidity. The fatty acid is suitably a linear or branched fatty acid. Moreover, both saturated and unsaturated fatty acids can be used.

Examples of the fatty acid include natural oil/fat-derived fatty acids and synthetic fatty acids. Examples of the natural fatty acids include those derived from natural oils and fats such as palm oil, beef tallow, rapeseed oil, rice bran oil, and fish oil. Examples of the synthetic fatty acids include higher fatty acids having 5 to 36 carbon atoms. Specific examples thereof include saturated fatty acids such as caprylic acid, pelargonic acid, capric acid, undecanoic acid, lauric acid, tridecylic acid, myristic acid, pentadecylic acid, palmitic acid, margaric acid, stearic acid, nonadecylic acid, and arachidic acid, and their branched isomers; and unsaturated fatty acids such as oleic acid, erucic acid, linoleic acid, linolenic acid, elaidic acid, stealoric acid, ricinoleic acid, ricinelaidic acid, arachidonic acid, vaccenic acid, myristoleic acid, and palmitoleic acid, and their branched isomers.

Examples of dihydric alcohols usable as the polyhydric alcohol forming the polyhydric alcohol nonionic surfactant include aliphatic, alicyclic, and aromatic dihydric alcohols having 2 or more carbon atoms. Specific examples thereof include (di)alkylene glycols (alkylene glycols and dialkylene glycols) such as (di)ethylene glycol, (di)propylene glycol, 1,2-, 1,3-, 2,3-, and 1,4-butanediols, neopentyl glycol, 3-methyl-1,5-pentanediol, 1,6-hexanediol, 2-methyl-1,8-octanediol, 1,9-nonanediol, and 1,12-dodecanediol; low-molecular-weight diols containing a cyclic group, bis(hydroxymethyl)cyclohexane, and bis(hydroxyethyl)benzene. Examples of trihydric or higher hydric alcohols (e.g. trihydric to octahydric alcohols) include alkanepolyols (triols such as trimethylolpropane, glycerol, and hexanetriol; and tetrahydric or higher hydric alcohols such as pentaerythritol, sorbitol, xylitol, and mannitol), and their intermolecular or intramolecular dehydration products (e.g., polyglycerol such as diglycerol, dipentaerythritol, and sorbitan), saccharides (e.g., glucose, fructose, and sucrose), EO adducts of saccharides, fatty acid esters of EO adducts of saccharides, fatty acid esters of saccharides, sugar alcohols (e.g., alcohols obtained by reducing the aldehyde or ketone group of a monosaccharide such as triose, tetrose, pentose, and hexose, and specific examples thereof include: glycerol derived from triose; erithrite and threit which are derived from tetrose; arabite, ribitol, and xylit which are derived from pentose; sorbit, mannite, altritol, and galactitol which are derived from hexose), EO adducts of sugar alcohols, fatty acid esters of EO adducts of sugar alcohols, and fatty acid esters of sugar alcohols. Among these, glycerol, polyglycerol, saccharides, and sugar alcohols are preferred, and glycerol is particularly preferred, because they contribute to better resilience, flexibility, and fluidity.

Examples of the alkanolamine forming the fatty acid alkanolamide include monoethanolamine, diethanolamine, triethanolamine, mono-n-propanolamine, di-n-propanolamine, tri-n-propanolamine, monoisopropanolamine, diisopropanolamine, triisopropanolamine, N-methylethanolamine, N-ethylethanolamine, N-isopropylethanolamine, N,N-dimethylethanolamine, N,N-diethylethanolamine, N-cyclohexyldiethanolamine, N-cyclohexyldipropanolamine, N-benzyldiethanolamine, and N-benzyldipropanolamine.

Specific examples of the polyhydric alcohol nonionic surfactant include glycerol monocaprylate, glycerol monocaprate, glycerol monolaurate, glycerol monostearate, glycerol monooleate, glycerol dilaurate, glycerol distearate, glycerol dioleate, diglycerol monolaurate, diglycerol monostearate, diglycerol monooleate, pentaerythritol monolaurate, pentaerythritol monostearate, pentaerythritol monooleate, pentaerythritol dilaurate, pentaerythritol distearate, pentaerythritol dioleate, sorbitan monolaurate, sorbitan monostearate, sorbitan monooleate, sorbitan dilaurate, sorbitan distearate, sorbitan dioleate, sorbitan trilaurate, sorbitan tristearate, sorbitan trioleate, sorbitan tetralaurate, sorbitan tetrastearate, and sorbitan tetraoleate. Among these, glycerol monocaprylate, glycerol monocaprate, glycerol monooleate, glycerol dioleate, diglycerol monolaurate, sorbitan monooleate, sorbitan dioleate, sorbitan trioleate, and sorbitan tetraoleate are preferred, and glycerol monocaprylate, glycerol monocaprate, and diglycerol monolaurate are particularly preferred, because they contribute to better resilience, flexibility, and fluidity. These polyhydric alcohol nonionic surfactants may be used singly or in combinations of two or more.

The polyethylene glycol nonionic surfactant refers to a nonionic surfactant obtained by adding ethylene oxide to a hydrophobic group-containing raw material for surfactants, such as a higher alcohol or a fatty acid. The alkyl or alkenyl group of the hydrophobic group-containing raw material is not particularly limited, and is preferably an alkyl or alkenyl group having 12 to 18 carbon atoms. The number of moles of ethylene oxide added is preferably 2 to 40 although it depends on the hydrophobic group attached.

Examples of the polyethylene glycol nonionic surfactant include higher alcohol-ethylene oxide adducts and alkylphenol-ethylene oxide adducts. Specific examples thereof include polyoxyethylene lauryl ether, polyoxyethylene stearyl ether, polyoxyethylene oleyl ether, and polyoxyethylene octylphenol. These polyethylene glycol nonionic surfactants may be used singly or in combinations of two or more.

The content of the nonionic surfactant (C) is preferably 10 parts by mass or more, more preferably 20 parts by mass or more, still more preferably 25 parts by mass or more, and particularly preferably 30 parts by mass or more, per 100 parts by mass of the resin component. The content is preferably 200 parts by mass or less, more preferably 150 parts by mass or less, still more preferably 120 parts by mass or less, and particularly preferably 100 parts by mass or less. With a content in that range, resilience and flexibility can be improved in a balanced manner.

The blending ratio [(B)/(C)] of the compound (B) containing a hydrocarbon chain, a cationic moiety, and an anionic moiety in its molecule to the nonionic surfactant (C) is preferably 95/5 to 15/85, more preferably 90/10 to 35/65, and still more preferably 85/15 to 55/45 by mass ratio. With a blending ratio in that range, resilience and flexibility can be improved in a balanced manner.

The compound (B) containing a hydrocarbon chain, a cationic moiety, and an anionic moiety in its molecule is preferably contained in an amount larger than that of the nonionic surfactant (C) because then resilience and flexibility can be improved in a balanced manner. More preferably, [(amount of (B))−(amount of (C))]≥5 parts by mass, and still more preferably [(amount of (B))−(amount of (C))]≥10 parts by mass. The upper limit is not particularly limited. Preferably, [(amount of (B))−(amount of (C))]≤100 parts by mass, and more preferably, [(amount of (B))−(amount of (C))]≤90 parts by mass.

The resin composition for golf balls of the present invention may further contain (D) a basic inorganic metal compound. The basic inorganic metal compound (D) is added as necessary to neutralize unneutralized carboxyl groups in the component (A). Examples of the basic inorganic metal compound (D) include elemental metals such as sodium, lithium, potassium, calcium, and magnesium; metal hydroxides such as magnesium hydroxide, calcium hydroxide, sodium hydroxide, lithium hydroxide, potassium hydroxide, and copper hydroxide; metal oxides such as magnesium oxide, calcium oxide, zinc oxide, and copper oxide; and metal carbonates such as magnesium carbonate, calcium carbonate, sodium carbonate, lithium carbonate, and potassium carbonate. These basic inorganic metal compounds (D) may be used singly or in combinations of two or more. Among these, suitable basic inorganic metal compounds (D) are magnesium hydroxide, calcium hydroxide, sodium carbonate, lithium carbonate, potassium carbonate, zinc oxide, and copper oxide.

The content of the basic inorganic metal compound (D) is preferably more than 0 parts by mass, and more preferably 1 part by mass or more, per 100 parts by mass of the resin component. The content is preferably 100 parts by mass or less, and more preferably 70 parts by mass or less. With an excessively small content, the amount of ionic aggregates may be small, leading to low resilience. Conversely, with an excessively large content, durability may be reduced.

The resin composition for golf balls of the present invention has a total degree of neutralization expressed by the following equation of 50 to 300 mol %. The lower limit is preferably 80 mol % or more, more preferably 120 mol % or more, and still more preferably 160 mol % or more. The upper limit is preferably 300 mol % or less, more preferably 280 mol % or less, and still more preferably 240 mol % or less. With a total degree of neutralization of 50 mol % or more, the amount of ionic aggregates is sufficiently large, leading to high resilience. With a total degree of neutralization of 300 mol % or less, the basic inorganic metal compound can be uniformly dispersed to improve durability.

$$\text{Total degree of neutralization (\%)} = \frac{\sum(\text{number of moles of cation component in resin composition} \times \text{valence of cation component})}{\sum(\text{number of moles of anion component in resin composition} \times \text{valence of anion component})} \times 100$$

In the equation, Σ(number of moles of cation component in resin composition×valence of cation component) is (the number of moles of the cation component of the resin component (A))×(the valence of the cation component)+(the number of moles of the cation-forming group or cation component of the compound (B) containing a hydrocarbon chain, a cationic moiety, and an anionic moiety in its molecule)×(the valence of the cation-forming group or cation component)+(the number of moles of the metal component of the basic inorganic metal compound (D))×(the valence of the metal component). Σ(number of moles of anion component in resin composition×valence of anion component) is (the number of moles of the carboxyl group of the resin component (A))+(the number of moles of the anion-forming group of the compound (B) containing a hydrocarbon chain, a cationic moiety, and an anionic moiety in its molecule)×(the valence of the anion-forming group).

It should be noted that the numbers of moles of the cation component, the cation-forming group, the metal component, the carboxyl group, and the anion-forming group include the respective non-ionized precursors. The amounts of the cation component, the cation-forming group, and the anion-forming group may be determined by neutralization titration, for example.

The resin composition for golf balls of the present invention may further contain any additives such as a pigment component such as a white pigment (e.g., titanium oxide) and a blue pigment, weighting agents, dispersants, antioxidants, ultraviolet absorbing agents, light stabilizers, fluorescent materials, and fluorescent brighteners in a range that does not impair the performance of the golf ball. The resin composition for golf balls of the present invention may further incorporate, for example, a fatty acid and/or a metal salt thereof in combination in a range that does not impair the effects of the present invention.

The content of the white pigment (e.g., titanium oxide) is preferably 0.5 parts by mass or more, and more preferably 1 part by mass or more, per 100 parts by mass of the resin component. The content is preferably 10 parts by mass or less, and more preferably 8 parts by mass or less. With a content of 0.5 parts by mass or more, hiding properties can be given to a golf ball structural member to be obtained. With a content of more than 10 parts by mass, a golf ball to be obtained may have reduced durability.

The resin composition for golf balls of the present invention can be obtained, for example, by dry-blending the component (A), the component (B), the component (C), and optionally the component (D). The dry-blended mixture may be extruded into pellets. The dry-blending is preferably performed using, for example, a mixer that can mix pelletized materials, more preferably by a tumbler mixer. The extrusion may be performed using a known extruder such as a single-screw extruder, a twin-screw extruder, or a twin-screw/single-screw extruder.

The resin composition for golf balls of the present invention preferably has a spin-lattice relaxation time of $^{13}C$ nuclei (T1), measured by high-resolution solid-state $^{13}C$ nuclear magnetic resonance (NMR) spectroscopy, of 15 seconds or shorter. When the decay of magnetization is measured in an ionomer resin based on the spin-lattice relaxation time of $^{13}C$ nuclei (T1) measured by high-resolution solid-state $^{13}C$ nuclear magnetic resonance (NMR) spectroscopy, this relaxation time (T1) is considered to be attributable to the trans conformation of the ethylene chains. The present inventors have considered that the moieties that may have a trans conformation include the poly(ethylene) crystals and the restricted ethylene chain layer around each ionic aggregate, and thus the relaxation components in the measurement of the decay of magnetization can also be divided into the short-time component and the long-time component. Based on this consideration, they have found that the restricted ethylene chain layer correlates with resilience. In other words, the shorter the relaxation time (T1) is, the higher the mobility of the restricted ethylene chain layer is, and in turn the more increased the resilience is. Further, an increase in the molecular mobility is expected to cause the effect of increasing flexibility. Therefore, the resin composition for golf balls of the present invention preferably has a spin-lattice relaxation time of $^{13}C$ nuclei (T1), measured by high-resolution solid-state $^{13}C$ nuclear magnetic resonance (NMR) spectroscopy, as short as described above.

The resin composition for golf balls of the present invention preferably has a storage modulus E' (Pa) and a loss modulus E" (Pa) which satisfy the following equation, as measured using a dynamic viscoelasticity meter in a tensile mode at a vibration frequency of 10 Hz, a temperature of 12° C., and a measurement strain of 0.05%.

A resin composition for golf balls satisfying the following equation can have high resilience while maintaining softness in a high level. In the following equation, the symbol "log" means the common logarithm.

$$\log(E'/E''^2) \geq -6.55$$

It is considered that the higher the storage modulus E' (Pa) is or the lower the loss modulus E" (Pa) is, the higher the resilience is. In addition, the higher the storage modulus E' (Pa) is, the higher the hardness is. In the above equation, the numerator is the first power of the storage modulus E', whereas the denominator is the second power of the loss modulus E". This means that for increase of resilience, it is more effective to reduce the loss modulus E" than to increase the storage modulus E' so as to increase the hardness. In other words, it is considered that what is necessary to increase resilience without hardening the material is to reduce the modulus E" so as to reduce the energy loss upon deformation. In the present invention, since an increase in the molecular mobility as described above enables the material to be smoothly deformed against a stress, it is considered that the energy loss is small and therefore the resilience is increased.

The upper limit of $\log(E'/E''^2)$ is not particularly limited, and it is preferably −5.24 or lower, and more preferably −5.40 or lower, because if the value of $\log(E'/E''^2)$ comes to −5.25, the coefficient of restitution becomes close to the maximum value of 1. The reason why the conditions for measuring the dynamic viscoelasticity are at a vibration frequency of 10 Hz and a temperature of 12° C. is as follows. The period of contact between a golf ball and an impact bar (metal cylinder) is 500 μs in the measurement of coefficient of restitution at 40 m/s. If this contact is assumed to correspond to deformation in one cycle, this deformation corresponds to deformation at a frequency of several thousand hertz. Based on the frequency-temperature superposition principle of general ionomer resin, the dynamic viscoelasticity measured at room temperature and a vibration frequency of several thousand hertz corresponds to the dynamic viscoelasticity measured at a temperature of 12° C. and a vibration frequency of 10 Hz.

The resin composition for golf balls of the present invention preferably has a melt flow rate (190° C., 2.16 kg) of 0.01 g/10 min or more, more preferably 1 g/10 min or more, and still more preferably 10 g/10 min or more. The melt flow rate is preferably 150 g/10 min or less, more preferably 100 g/10 min or less, and still more preferably 80 g/10 min or less. With a melt flow rate in that range, the resin composition has good molding properties for forming a golf ball structural member.

The resin composition for golf balls preferably has a rebound resilience of 40% or more, more preferably 43% or more, and still more preferably 46% or more. Use of the resin composition for golf balls having a rebound resilience of 40% or more provides a golf ball having excellent resilience (flight distance). The rebound resilience herein is a rebound resilience measured after the resin composition for golf balls is formed into a sheet, and is measured by the method mentioned later.

The resin composition for golf balls preferably has a slab hardness of 5 or more, more preferably 7 or more, and still more preferably 10 or more in terms of Shore D hardness. The slab hardness (Shore D hardness) is preferably 70 or less, more preferably 65 or less, still more preferably 60 or less, and most preferably 50 or less. Use of the resin composition for golf balls having a slab hardness of 5 or more provides a golf ball having excellent resilience (flight distance). Conversely, use of the resin composition for golf balls having a slab hardness of 70 or less provides a golf ball having excellent durability. The slab hardness of the resin composition for golf balls herein is a hardness measured after the resin composition for golf balls is formed into a sheet, and is measured by the method mentioned later.

The golf ball of the present invention is not particularly limited as long as it includes a structural member formed from the resin composition for golf balls. Examples thereof include one-piece golf balls; two-piece golf balls including a monolayer core and a cover disposed so as to cover the monolayer core; three-piece golf balls including a core that has a center and a single interlayer disposed so as to cover the center, and a cover disposed so as to cover the core; and multi-piece golf balls (including the three-piece golf balls) including a core that has a center and one or more interlayers disposed so as to cover the center, and a cover disposed so as to cover the core, provided that any of the structural members of each golf ball is formed from the resin composition for golf balls of the present invention. Preferred among these are: golf balls including a core that has one or more layers and a cover covering the core, wherein at least one of the layers of the core is formed from the resin composition for golf balls; and one-piece golf balls including a golf ball body formed from the resin composition for golf balls. Particularly preferred are: two-piece golf balls including a monolayer core and a cover disposed so as to cover the monolayer core, wherein the monolayer core is formed from the resin composition for golf balls; and multi-piece golf balls including a core that has a center and one or more interlayers disposed so as to cover the center, and a cover disposed so as to cover the core, wherein the center is formed from the resin composition for golf balls.

The following will describe one example of the golf ball of the present invention based on, but not limited to, one embodiment of a two-piece golf ball including a core and a cover disposed so as to cover the core, wherein the core is formed from the aforementioned resin composition for golf balls.

The core may be formed by, for example, injection-molding the resin composition for golf balls mentioned above. Specifically, it is preferable that the resin composition for golf balls is heat-melted at 160° C. to 260° C. and injected in 1 to 100 seconds into a mold clamped under a pressure of 1 to 100 MPa, and then the resin composition is cooled for 30 to 300 seconds and the mold is opened.

The shape of the core is preferably a spherical shape. If the core is not spherical, then the cover may have a non-uniform thickness, thereby resulting in its portion having poor covering performance.

The diameter of the core is preferably 39.00 mm or more, more preferably 39.25 mm or more, and still more preferably 39.50 mm or more. The diameter is preferably 42.37 mm or less, more preferably 42.22 mm or less, and still more preferably 42.07 mm or less. With a diameter of the core of 39.00 mm or more, the thickness of the cover layer is prevented from being excessively large, which results in good resilience. Conversely, with a diameter of the core of 42.37 mm or less, the cover layer is prevented from being excessively thin, and the protection function of the cover can be sufficiently exhibited.

In the case that the core has a diameter of 39.00 to 42.37 mm, the amount of compression deformation (shrink in the compression direction) of the core under a load from an initial load of 98 N to a final load of 1275 N is preferably 1.00 mm or more, and more preferably 1.10 mm or more. The amount of compression deformation is preferably 5.00 mm or less, more preferably 4.90 mm or less, and still more preferably 4.80 mm or less. With an amount of compression deformation of 1.00 mm or more, good shot feel is attained. With an amount of compression deformation of 5.00 mm or less, good resilience is attained.

The core preferably has a surface hardness of 20 or more, more preferably 25 or more, and still more preferably 30 or more in terms of Shore D hardness. The surface hardness (Shore D hardness) is preferably 70 or less, and more preferably 69 or less. With a surface hardness of 20 or more, the core is prevented from being excessively soft, which leads to good resilience. With a surface hardness of 70 or less, the core is prevented from being excessively hard, which leads to good shot feel.

The core preferably has a central hardness of 5 or more, more preferably 7 or more, and still more preferably 10 or more in terms of Shore D hardness. With a central hardness of less than 5, the core may become excessively soft and thereby lead to reduced resilience. The core preferably has a central hardness of 50 or less, more preferably 48 or less, and still more preferably 46 or less in terms of Shore D hardness. With a central hardness of more than 50, the core tends to become excessively hard and thereby lead to poorer shot feel. In the present invention, the central hardness of the core means a hardness measured as follows: the core is cut into two equal parts, and the part is measured at the central point of the cut plane using a spring type Shore D hardness tester.

The core preferably contains a filler. The filler is mainly intended to be added as a weighting agent for adjusting the density of a golf ball to be obtained as the final product in the range of 1.0 to 1.5, and it may be added as necessary. Examples of the filler include inorganic fillers such as zinc oxide, barium sulfate, calcium carbonate, magnesium oxide, tungsten powder, and molybdenum powder. The amount of the filler added is preferably 0.5 parts by mass or more, and more preferably 1.0 part by mass or more, per 100 parts by mass of the resin component. The amount is preferably 30 parts by mass or less, and more preferably 20 parts by mass or less. With an amount of less than 0.5 parts by mass, the weight is difficult to adjust. With an amount of more than 30 parts by mass, the weight fraction of the resin component tends to be small, leading to reduced resilience.

The cover for the golf ball of the present invention is preferably formed from a cover composition containing a resin component. Examples of the resin component include a variety of resins such as ionomer resins, polyester resins, urethane resins such as thermoplastic urethane resins and two-pack curable urethane resins, and polyamide resins; thermoplastic polyamide elastomers available from Arkema under the trade name "PEBAX (registered trademark) (e.g., "PEBAX 2533")"; thermoplastic polyester elastomers available from Du Pont-Toray Co., Ltd. under the trade name "Hytrel (registered trademark) (e.g., "Hytrel 3548" and "Hytrel 4047")"; thermoplastic polyurethane elastomers available from BASF Japan Ltd. under the trade name "Elastollan (registered trademark) (e.g., "Elastollan XNY97A")"; and thermoplastic styrene elastomers available from Mitsubishi Chemical Corporation under the trade name "RABALON (registered trademark)." These materials usable as the resin component may be used singly or as a blend of two or more.

Preferred examples of ionomer resins usable for the cover of the golf ball include those listed for the component (a-2) and the component (a-4).

The cover composition forming the cover of the golf ball more preferably contains a polyurethane resin (including a polyurethane elastomer) or an ionomer resin as the resin component. The content of the polyurethane resin or ionomer resin is preferably 50% by mass or more, more preferably 60% by mass or more, and still more preferably 70% by mass or more of the resin component of the cover composition.

Besides the resin component mentioned above, the cover composition may contain any additives such as a pigment component such as a white pigment (e.g., titanium oxide), a blue pigment and a red pigment, zinc oxide, weighting agents such as calcium carbonate and barium sulfate, dispersants, antioxidants, ultraviolet absorbing agents, light stabilizers, fluorescent materials, and fluorescent brighteners in a range that does not impair the performance of the cover.

The content of the white pigment (e.g., titanium oxide) is preferably 0.5 parts by mass or more, and more preferably 1 part by mass or more, per 100 parts by mass of the resin component forming the cover. The content is preferably 10 parts by mass or less, and more preferably 8 parts by mass or less. With a content of 0.5 parts by mass or more, hiding properties can be given to the cover. With a content of more than 10 parts by mass, a cover to be obtained may have reduced durability.

Examples of the method for forming the cover of the golf ball of the present invention include: compression molding in which hollow shells are formed from the cover composition, the core is covered with the plurality of shells, and then the assembly is compression-molded (preferably, hollow half shells are formed from the cover composition, the core is covered with the two half shells, and then the assembly is compression-molded); and injection molding in which the cover composition is directly injection-molded on the core.

In the case of forming a cover by injection molding of the cover composition, the pelletized cover composition, which is prepared by extrusion in advance, may be injection-molded, or materials for covers such as a base resin component and a pigment may be dry-blended and then directly injection-molded. Upper and lower molds for forming a cover each preferably have a hemispherical cavity with pimples part of which also serve as retractable hold pins. A cover can be formed by injection molding as follows: the hold pins are protruded; a core is put into the mold and held by the pins; then the cover composition is injected thereon and cooled. More specifically, it is preferable that the mold is clamped under a pressure of 9 to 15 MPa, the cover composition heated to 200° C. to 250° C. is injected into the mold in 0.5 to 5 seconds, and then the composition is cooled for 10 to 60 seconds and the mold is opened.

In forming a cover, indentations called dimples are formed on the surface, in general. The cover preferably has 200 to 500 dimples in total. If the total number of dimples is less than 200, the effect of dimples is less likely to be achieved. If the total number of dimples exceeds 500, the effect of dimples is less likely to be achieved because the individual size of the dimples becomes small. The shape (in a plan view) of each dimple to be formed is not particularly limited, and mention may be made of a circular shape; polygonal shapes such as a substantially triangular shape, substantially quadrangular shape, substantially pentagonal shape, and substantially hexagonal shape; and other irregular shapes. These shapes may be used singly or in combinations of two or more.

The cover preferably has a thickness of 2.0 mm or less, more preferably 1.6 mm or less, still more preferably 1.2 mm or less, and particularly preferably 1.0 mm or less. With a thickness of the cover of 2.0 mm or less, a golf ball to be obtained attains better resilience and better shot feel. The cover preferably has a thickness of 0.1 mm or more, more preferably 0.2 mm or more, and still more preferably 0.3 mm or more. With a thickness of less than 0.1 mm, the cover may be difficult to form, and the durability and abrasion resistance of the cover may decrease.

After the cover is formed, the golf ball body is taken out of the mold, and is preferably subjected to surface treatment such as deburring, cleaning, and sandblasting, as necessary. If desired, a paint layer or a mark may be formed thereon. The thickness of the paint layer is not particularly limited, and it is preferably 5 μm or greater, and more preferably 7 μm or greater. The thickness is preferably 25 μm or smaller, and more preferably 18 μm or smaller. If the thickness is smaller than 5 μm, the paint layer is more likely to wear out and disappear after continuous use. If the thickness exceeds 25 μm, the effect of dimples is likely to be reduced, resulting in reduction of the flight performance of the golf ball.

The golf ball of the present invention preferably has an amount of compression deformation (shrink in the compression direction) under a load from an initial load of 98 N to a final load of 1275 N of 2.0 mm or more, more preferably 2.2 mm or more. The amount of compression deformation is preferably 4.0 mm or less, and more preferably 3.5 mm or less. With an amount of compression deformation of 2.0 mm or more, the golf ball is prevented from being excessively hard, and attains good shot feel. Conversely, with an amount of compression deformation of 4.0 mm or less, resilience increases.

Hereinbefore, the embodiment in which the resin composition for golf balls of the present invention is used for a core is described. The resin composition for golf balls of the present invention can also be used for centers, interlayers, and covers. In the case of a center formed from the resin composition for golf balls of the present invention, an interlayer is combined which is formed from materials such as those listed above as the resin component in the cover materials.

Examples

The present invention will be specifically described referring to Examples, but the present invention is not limited only to these.

[Evaluation Method]

(1) Slab Hardness (Shore D Hardness)

The resin composition for golf balls was hot press-molded to form a sheet having a thickness of about 2 mm, and the sheet was stored at 23° C. for 2 weeks. Three or more pieces of the sheet were stacked on one another so as not to be affected by the measurement substrate and the like, and the slab hardness of the stack was measured using a P1-series auto rubber hardness tester (from KOBUNSHI KEIKI CO., LTD.) including a spring type Shore D hardness tester in conformity with ASTM-D 2240.

(2) Melt Flow Rate (MFR) (g/10 Min)

MFR was measured using a flow tester (SHIMADZU Flowtester CFT-100C made by SHIMADZU Corporation) according to JIS K7210. The measurement was performed at a measurement temperature of 190° C. and a load of 2.16 kg.

(3) Rebound Resilience (%)

The resin composition for golf balls was hot press-molded to form a sheet with a thickness of about 2 mm. Circles having a diameter of 28 mm were punched out of this sheet, and then six pieces were stacked to prepare a cylindrical specimen with a thickness of about 12 mm and a diameter of 28 mm. This specimen was subjected to the Lupke rebound resilience test (testing at temperature 23° C. and humidity 50 RH %). The specimen preparation and the testing method were carried out according to JIS K6255.

(4) Amount of Compression Deformation

A spherical body was compressed under a load from an initial load of 98 N to a final load of 1275 N, and the amount of deformation in the compression direction (shrink in the compression direction) of the spherical body was measured. The amount of compression deformation of each ball was expressed as a ratio relative to the amount of compression deformation of the ball No. 5.

(5) Coefficient of Restitution

A 198.4-g metal cylinder was collided with each spherical body at a speed of 40 m/sec. The speeds of the cylinder and the golf ball before and after the collision were measured. Based on these speeds and weights, the coefficient of restitution of each golf ball was calculated. Each spherical body was subjected to the measurement 12 times, and the average value was treated as the coefficient of restitution for the spherical body.

(6) Shot Feel

Each golf ball was subjected to a hitting test by 10 amateur (advanced) golfers using a driver, and the golfers evaluated the ball for the feel when hitting it based on the following criteria. The most common grade among the grades given by the 10 golfers was treated as the shot feel of the golf ball.

Criteria for Grades

Excellent: small impact and good feel
Acceptable: ordinary levels
Poor: large impact and poor feel (7) Method for Measuring Spin-Lattice Relaxation Time of $^{13}C$ Nuclei (T1) by High-Resolution Solid-State $^{13}C$ Nuclear Magnetic Resonance (NMR) Spectroscopy Device: Bruker Avance 400
Measurement method: T1 relaxation time measurement by Torchia method
Measurement frequency: 100.6256207 MHz
Measurement temperature: room temperature
Standard substance: adamantane Magic angle spinning rate: 5000 Hz
Pulse width: 4.80 μsec
Contact time: 2000 μsec
Pulse interval: 1 μsec, 100 msec, 500 msec, 1 sec, 2 sec, 3 sec, 4 sec, 6 sec, 8 sec, 10 sec, 12 sec, 15 sec, 20 sec, 40 sec, 80 sec, and 120 sec
Magnetic field strength: 9.4 T (8) Measurement of Storage Modulus E' (Pa) and Loss Modulus E" (Pa)

The storage modulus E' (Pa) and loss modulus E" (Pa) of the resin composition for golf balls were measured under the following conditions.
Device: dynamic viscoelasticity meter Rheogel-E 4000 (available from UBM)
Measurement sample: a 4-mm-wide specimen (distance between clamps: 20 mm) cut out of a 2-mm-thick sheet that was prepared by press-molding the resin composition for golf balls
Measurement mode: Tensile
Measurement temperature: 12° C.
Vibration frequency: 10 Hz
Measurement strain: 0.05%

(9) Processability

Samples were rated as poor if the melt flow rate (g/10 min) was less than 1; acceptable if the melt flow rate (g/10 min) was at least 1 but less than 2; good if the melt flow rate (g/10 min) was at least 2 but less than 5; and excellent if the melt flow rate (g/10 min) was 5 or more.

[Preparation of Spherical Body (Core)]

As shown in Table 1, the formulation materials were dry-blended and mixed using a twin-screw kneading extruder. Then, the mixture was extruded into cold water to form a strand. The extruded strand was cut into pellets using a pelletizer, whereby a pelletized resin composition for golf balls was prepared. Here, the extrusion was performed at a screw diameter of 45 mm, a screw rotation rate of 200 rpm, and a screw L/D ratio of 35. The mixture was heated to 160° C. to 230° C. in the die of the extruder. The pelletized resin composition for golf balls obtained was injection-molded at 220° C. to obtain a spherical body (core) with a diameter of 40 mm.

TABLE 1

| | | | Resin composition for golf balls (spherical body) No. | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Formulation amount (parts by mass) | Component (A) | NUCREL AN4319 | 100.0 | 100.0 | 100.0 | 100.0 | 100.0 | 100.0 | 100.0 | 100.0 | 100.0 | 100.0 | 100.0 |
| | | NUCREL N1560 | — | — | — | — | — | — | — | — | — | — | — |
| | Component (D) | Magnesium hydroxide | 0.2 | 1.0 | 4.4 | 7.8 | 11.2 | 14.6 | 18.0 | 21.4 | 7.9 | 11.2 | 11.2 |
| | Component (B) | Oleyl betaine | 70.0 | 70.0 | 70.0 | 70.0 | 70.0 | 70.0 | 70.0 | 70.0 | 30.0 | 30.0 | 70.0 |
| | | Lauryl betaine | — | — | — | — | — | — | — | — | — | — | — |
| | | Stearyl betaine | — | — | — | — | — | — | — | — | — | — | — |
| | Component (C) | Glycerol monooleate | — | — | — | — | — | — | — | — | — | — | — |
| | | Sorbitan monooleate | 40.0 | 40.0 | 40.0 | 40.0 | 40.0 | 40.0 | 40.0 | 40.0 | 40.0 | 20.0 | 20.0 |
| | | Sorbitan trioleate | — | — | — | — | — | — | — | — | — | — | — |
| | | Glycerol monocaprylate | — | — | — | — | — | — | — | — | — | — | — |
| | | Glycerol monocaprate | — | — | — | — | — | — | — | — | — | — | — |
| | | Diglycerol monolaurate | — | — | — | — | — | — | — | — | — | — | — |
| Total degree of neutralization (mol %) | | | 40% | 80% | 120% | 160% | 200% | 240% | 280% | 320% | 200% | 200% | 200% |
| Amount ratio B/C | | | 7:4 | 7:4 | 7:4 | 7:4 | 7:4 | 7:4 | 7:4 | 7:4 | 3:4 | 3:2 | 7:2 |
| Melt flow rate (g/10 min) | | | 45.3 | 19.8 | 8.0 | 7.2 | 5.8 | 4.2 | 2.3 | 0.8 | 24.8 | 9.8 | 6.7 |
| Log (E'/E"$^2$) | | | −6.36 | −5.60 | −5.29 | −5.33 | −5.29 | −5.33 | −5.33 | −5.33 | −5.56 | −5.52 | −5.45 |
| T1 relaxation time (sec.) | | | 12.7 | 3.7 | 2.3 | 2.4 | 2.3 | 2.4 | 2.4 | 2.4 | 3.5 | 3.3 | 2.9 |
| Slab properties | Shore D hardness | | 13 | 15 | 20 | 29 | 23 | 25 | 27 | 30 | 18 | 33 | 19 |
| | Lupke rebound resilience (%) | | 49 | 69 | 72 | 76 | 77 | 76 | 76 | 76 | 70 | 71 | 73 |
| Core properties | Amount of compression deformation | | 4.05 | 2.88 | 1.00 | 0.60 | 1.00 | 0.85 | 0.71 | 0.55 | 1.86 | 0.44 | 1.64 |
| | Coefficient of restitution (40 m/s) | | 0.651 | 0.862 | 0.946 | 0.936 | 0.946 | 0.936 | 0.936 | 0.936 | 0.873 | 0.883 | 0.904 |
| | Shot feel | | Acceptable | Excellent | Excellent | Excellent | Excellent | Excellent | Excellent | Excellent | Excellent | Excellent | Excellent |
| | Processability | | Excellent | Excellent | Excellent | Excellent | Excellent | Good | Good | Poor | Excellent | Excellent | Excellent |

TABLE 1-continued

| | | | colspan="10" | Resin composition for golf balls (spherical body) No. |
|---|---|---|---|---|---|---|---|---|---|---|---|
| | | | 12 | 13 | 14 | 15 | 16 | 17 | 18 | 19 | 20 | 21 |
| Formulation amount (parts by mass) | Component (A) | NUCREL AN4319 | 100.0 | 100.0 | 100.0 | 100.0 | 100.0 | 100.0 | 100.0 | — | 100.0 | 100.0 |
| | | NUCREL N1560 | — | — | — | — | — | — | — | 100.0 | — | — |
| | Component (D) | Magnesium hydroxide | 11.2 | 11.2 | 7.8 | 7.8 | 7.8 | 7.8 | 7.8 | 15.9 | 7.2 | 10.7 |
| | Component (B) | Oleyl betaine | — | — | 70.0 | 70.0 | 70.0 | 70.0 | 70.0 | 70.0 | — | 70.0 |
| | | Lauryl betaine | 70.0 | — | — | — | — | — | — | — | — | — |
| | | Stearyl betaine | — | 70.0 | — | — | — | — | — | — | — | — |
| | Component (C) | Glycerol monooleate | — | — | 40.0 | — | — | — | — | — | — | — |
| | | Sorbitan monooleate | 40.0 | 40.0 | — | — | — | — | — | 40.0 | 70.0 | — |
| | | Sorbitan trioleate | — | — | — | 40.0 | — | — | — | — | — | — |
| | | Glycerol monocaprylate | — | — | — | — | 40.0 | — | — | — | — | — |
| | | Glycerol monocaprate | — | — | — | — | — | 40.0 | — | — | — | — |
| | | Diglycerol monolaurate | — | — | — | — | — | — | 40.0 | — | — | — |
| Total degree of neutralization (mol %) | | | 200% | 200% | 160% | 160% | 160% | 160% | 160% | 200% | 264% | 194% |
| Amount ratio B/C | | | 7:4 | 7:4 | 7:4 | 7:4 | 7:4 | 7:4 | 7:4 | 7:4 | — | — |
| Melt flow rate (g/10 min) | | | 6.0 | 5.1 | 3.0 | 8.1 | 9.8 | 12.4 | 7.7 | 5.2 | 56.3 | 0.2 |
| Log (E'/E''$^2$) | | | −5.33 | −5.37 | −5.29 | −5.37 | −5.33 | −5.38 | −5.35 | −5.33 | −5.64 | −5.26 |
| T1 relaxation time (sec.) | | | 2.4 | 2.6 | 2.3 | 2.6 | 2.4 | 2.6 | 2.5 | 2.4 | 3.9 | 2.1 |
| Slab properties | Shore D hardness | | 21 | 31 | 25 | 17 | 15 | 14 | 17 | 36 | 30 | 24 |
| | Lupke rebound resilience (%) | | 76 | 75 | 77 | 75 | 76 | 75 | 75 | 76 | 68 | 78 |
| Core properties | Amount of compression deformation | | 1.29 | 0.51 | 0.85 | 2.09 | 2.79 | 3.23 | 2.29 | 0.36 | 0.55 | 0.94 |
| | Coefficient of restitution (40 m/s) | | 0.936 | 0.925 | 0.946 | 0.925 | 0.936 | 0.923 | 0.929 | 0.936 | 0.851 | 0.957 |
| | Shot feel | | Excellent | Excellent | Excellent | Excellent | Excellent | Excellent | Excellent | Excellent | Excellent | Excellent |
| | Processability | | Excellent | Excellent | Good | Excellent | Excellent | Excellent | Excellent | Excellent | Excellent | Poor |

The raw materials used in Table 1 are as follows. NUCREL AN4319: ethylene/methacrylic acid/butyl acrylate copolymer (melt flow rate (190° C., 2.16 kg): 55 g/10 min, bending rigidity: 21 MPa, content of methacrylic acid: 8% by mass) made by DU PONT-MITSUI POLYCHEMICALS CO., LTD. NUCREL N1560: ethylene/methacrylic acid copolymer (melt flow rate (190° C., 2.16 kg): 60 g/10 min, bending rigidity: 83 MPa, content of methacrylic acid: 15% by mass) made by DU PONT-MITSUI POLYCHEMICALS CO., LTD.

Magnesium hydroxide: made by Wako Pure Chemical Industries, Ltd.

Oleyl betaine: refined product of "Chembetaine OL" (moisture and salts were removed) made by The Lubrizol Corporation Lauryl betaine: refined product of "NISSANANON BL" (moisture and salts were removed) made by NOF CORPORATION Stearyl betaine: refined product of "AMPHITOL 86B" (moisture and salts were removed) made by Kao Corporation
Glycerol monooleate (oleic acid monoglyceride): "RIKEMAL OL-100E" made by Riken Vitamin Co., Ltd.

Sorbitan monooleate: "POEM O-80V" made by Riken Vitamin Co., Ltd.

Sorbitan trioleate: "RIKEMAL OR-85" made by Riken Vitamin Co., Ltd.

Glycerol monocaprylate: "POEM M-100" made by Riken Vitamin Co., Ltd.

Glycerol monocaprate: "POEM M-200" made by Riken Vitamin Co., Ltd.

Diglycerol monolaurate: "POEM DL-100" made by Riken Vitamin Co., Ltd.

The results in Table 1 show that in the spherical bodies Nos. 1 to 11 prepared by using a ternary ionomer resin and adding two components, that is, oleyl betaine and sorbitan monooleate, the spherical bodies Nos. 2 to 7 and 9 to 11 having a total degree of neutralization in the range specified in the present invention had favorable melt flow rate, Shore D hardness, rebound resilience, and amount of compression deformation, and therefore are excellent in all of the following properties: resilience, shot feel, and processability; however, the spherical body No. 1 having a low total degree of neutralization is inferior in resilience (coefficient of restitution) and the spherical body No. 8 having a high total degree of neutralization is inferior in processability (melt flow rate). The spherical bodies Nos. 12 to 19 prepared by using lauryl betaine or stearyl betaine as the component (B), or glycerol monooleate, sorbitan trioleate, glycerol monocaprylate, glycerol monocaprate, or diglycerol monolaurate as the component (C), or a binary ionomer resin as the component (A) are also excellent in all of the properties. Particularly when glycerol monocaprylate, glycerol monocaprate, or diglycerol monolaurate was used as the component (C), the spherical bodies had excellent performance. In contrast, the spherical body No. 20 containing no component (B) is inferior in the coefficient of restitution (resilience), and the spherical body No. 21 containing no component (C) is inferior in processability (melt flow rate). These results demonstrate that the addition of the two components (B) and (C) to the resin component (A) can provide a golf ball having good molding properties during the production and, at the same time, having both excellent shot feel and resilience.

INDUSTRIAL APPLICABILITY

The present invention can provide a resin composition for golf balls having excellent resilience, flexibility and fluidity. Moreover, use of the resin composition can provide golf balls having excellent resilience and shot feel.

The invention claimed is:

1. A resin composition for golf balls, comprising:
(A) a resin component comprising at least one selected from the group consisting of (a-1) a binary copolymer of an olefin and a $C_{3-8}$ α,β-unsaturated carboxylic acid, (a-2) a metal ion-neutralized product of a binary copolymer of an olefin and a $C_{3-8}$ α,β-unsaturated carboxylic acid, (a-3) a ternary copolymer of an olefin, a $C_{3-8}$ α,β-unsaturated carboxylic acid, and an α,β-unsaturated carboxylic acid ester, and (a-4) a metal ion-neutralized product of a ternary copolymer of an olefin, a $C_{3-8}$ α,β-unsaturated carboxylic acid, and an α,β-unsaturated carboxylic acid ester;
(B) a compound containing a hydrocarbon chain, a cationic moiety, and an anionic moiety in its molecule wherein the compound is at least one selected from the group consisting of lauryl betaine, oleyl betaine, stearyl betaine, stearyl dihydroxymethyl betaine, stearyl dihydroxyethyl betaine, lauryl dihydroxymethyl betaine, lauryl dihydroxyethyl betaine, myristyl dihydroxymethyl betaine, behenyl dihydroxymethyl betaine, palmityl dihydroxyethyl betaine, oleyl dihydroxymethyl betaine, cocamidopropyl betaine, lauramidoalkyl betaines, 2-alkyl-N-carboxyalkyl imidazolinium betaines, lauramidoalkyl hydroxyl sulfobetaines, cocamidodialkyl hydroxyalkyl sulfobetaines, N-alkyl-b-aminopropionic acid salts, N-alkyl-b-iminodipropionic acid salts, alkyl diaminoalkyl glycines, alkyl polyaminoalkyl glycines, and alkylamino fatty acid sodium salts; and
(C) a nonionic surfactant,
wherein a total degree of neutralization expressed by the following equation is 50 to 300 mol %:

Total degree of neutralization (%) =

$$\frac{\sum(\text{number of moles of cation component in resin composition} \times \text{valence of cation component})}{\sum(\text{number of moles of anion component in resin composition} \times \text{valence of anion component})} \times 100.$$

2. The resin composition for golf balls according to claim 1, wherein the nonionic surfactant (C) is a polyhydric alcohol nonionic surfactant.

3. The resin composition for golf balls according to claim 1, wherein the nonionic surfactant (C) is at least one selected from the group consisting of fatty acid esters obtained by reaction of polyhydric alcohols with fatty acids, AO adducts of the fatty acid esters obtained by addition of alkylene oxides to the fatty acid esters, fatty acid alkanolamides obtained by reaction of fatty acids with alkanolamines, and alkyl ethers of polyhydric alcohols.

4. The resin composition for golf balls according to claim 1, wherein the nonionic surfactant (C) is a fatty acid ester obtained by reacting a polyhydric alcohol with a $C_{8-30}$ fatty acid.

5. The resin composition for golf balls according to claim 4, wherein the fatty acid ester is a compound in which hydroxyl groups of the polyhydric alcohol are partially esterified.

6. The resin composition for golf balls according to claim 2, wherein the polyhydric alcohol is at least one selected from the group consisting of glycerol, polyglycerol, saccharides, and sugar alcohols.

7. The resin composition for golf balls according to claim 1, wherein the nonionic surfactant (C) is at least one selected from the group consisting of glycerol monocaprylate, glycerol monocaprate, glycerol monooleate, glycerol dioleate, diglycerol monolaurate, sorbitan monooleate, sorbitan dioleate, sorbitan trioleate, and sorbitan tetraoleate.

8. The resin composition for golf balls according to claim 1, wherein the nonionic surfactant (C) is a polyhydric alcohol nonionic surfactant.

9. The resin composition for golf balls according to claim 1, wherein 1 to 200 parts by mass of the compound (B) containing a hydrocarbon chain, a cationic moiety, and an anionic moiety in its molecule is contained per 100 parts by mass of the resin component (A).

10. The resin composition for golf balls according to claim 1, wherein 10 to 200 parts by mass of the nonionic surfactant (C) is contained per 100 parts by mass of the resin component (A).

11. The resin composition for golf balls according to claim 1, which further comprises (D) a basic inorganic metal compound in an amount of 100 parts by mass or less per 100 parts by mass of the resin component (A).

12. The resin composition for golf balls according to claim 1, wherein a blending ratio [(B)/(C)] of the compound (B) containing a hydrocarbon chain, a cationic moiety, and an anionic moiety in its molecule to the nonionic surfactant (C) is 95/5 to 15/85 by mass ratio.

13. The resin composition for golf balls according to claim 1, which satisfies the following relationship:

5 parts by mass≤[(amount of (B))−(amount of (C))]
≤100 parts by mass.

14. A golf ball, comprising a structural member formed from the resin composition for golf balls according to claim 1.

15. A golf ball, comprising a core having one or more layers and a cover covering the core, wherein at least one of the layers of the core is formed from the resin composition for golf balls according to claim 1.

16. A one-piece golf ball, comprising a golf ball body formed from the resin composition for golf balls according to claim 1.

* * * * *